SINGLE WIRE CROSSPOINT SWITCHING CIRCUIT WITH EXTERNAL SIGNALING

Filed April 1, 1968

3 Sheets-Sheet 1

INVENTORS
JAMES M. WALTER &
FREDERIC D. RANDO

BY Eugene M. Whitacre

ATTORNEY

INVENTORS
JAMES M. WALTER &
FREDERIC D. RANDO
BY Eugene M. Whitacre
ATTORNEY

Nov. 17, 1970 J. M. WALTER ET AL 3,541,515

SINGLE WIRE CROSSPOINT SWITCHING CIRCUIT WITH EXTERNAL SIGNALING

Filed April 1, 1968 3 Sheets-Sheet 3

INVENTORS
JAMES M. WALTER &
FREDERIC D. RANDO

BY Eugene M. Whitacre

ATTORNEY

United States Patent Office 3,541,515
Patented Nov. 17, 1970

3,541,515

SINGLE WIRE CROSSPOINT SWITCHING CIRCUIT WITH EXTERNAL SIGNALING

James M. Walter, Collingswood, and Frederic D. Rando, Cherry Hill, N.J., assignors to RCA Corporation, a corporation of Delaware Filed Apr. 1, 1968, Ser. No. 717,676
Int. Cl. H04g *9/00;* H01h *47/22*
U.S. Cl. 340—166 4 Claims

ABSTRACT OF THE DISCLOSURE

A circuit whereby $m \times n$ switches control the cross-connections between $m$ input lines and $n$ output lines employing only one wire per switch, even when an indicator is used to give an indication of a cross-connection, the same wire being used to effect the switching and to control the indicator. Also, a signal is provided to an external circuit when any switch is activated even if the switch activated is one associated with a cross-connection already made.

BACKGROUND OF THE INVENTION

Selectively connecting $m$ input lines to $n$ output lines is a problem in communications and similar systems. Whether performed manually or automatically, the control part of the circuit containing the switches and indicators is preferably remotely located from the cross-connection switching points (called crosspoints). It is economically desirable to keep the number of wires connecting the remote control unit to the crosspoint switching unit at a minimum while still performing all the necessary functions. An advantage of keeping the number of wires in the remote control unit to a minimum is that the reliability of the unit increases. It is frequently undesirable or even impossible to service the remote control unit in such places as, for instance, where it is part of a large control console used in television studios or missile blockhouses. Another constraint affecting the circuit is that the remote control switch is preferably a momentary action switch, the switching unit providing the latching, i.e., the holding of the crosspoint after the switch in the remote control unit is released. The indicators on the remote control unit are to be activated by the state of the crosspoints and not by the remote control switches. This is especially necessary when several remote control units operate the same set of crosspoints.

In a single wire switching arrangement, the wires connecting the remote control unit to the crosspoint switching unit perform a dual function; they transmit to the crosspoint switching unit the information that a crosspoint is to be made and transmit the information from the crosspoint switching unit to the remote control unit that the crosspoint is made. Because in switching lines there are, in the simplest case, only two levels of signals, i.e., on or off, the wire will be in the same state whether transmitting a command or returning an indication. If a switch in the remote control unit is activated to command a cross-connection that is already made, there will be no change in the state of the signal on any wire. Therefore, there will be nothing to indicate that a switch command was given. There are circumstances where the information that a command was intended even though the crosspoint was already made is necessary as, for example, when there are several remote control units and the institution of a command must act to return control to the remote control unit instituting the command. Another example of the requirement of an external circuit exists in television studio switching systems where it is desired to connect the program line, one of the output lines, to the transmitter input whenever an input line is switched to the program line even though the input line switched is already on the program line but there is another output line connected to the transmitter input.

It is an object of this invention to provide a control for crosspoint switching that requires as few wires between the control unit and the crosspoint switching unit as possible consistent with the performance of the remote indicator function and commands.

It is a further object of this invention to provide a crosspoint switching control circuit that uses a single wire command line for each crosspoint and provides a signal to an external circuit that a command for a crosspoint was instituted even though that crosspoint was already made.

It is another object of this invention to provide a single wire crosspoint switching circuit with external signaling where the crosspoint is to be made concurrent with a timing pulse.

It is another object of this invention to provide a crosspoint switching system that can be used with automatic controllers such as electronic computers.

BRIEF SUMMARY OF THE INVENTION

The circuit of the invention includes several switches operable in either of two states. To each switch is connected one of several signal lines so that the operation of the connected switch to one state applies a reference potential to the signal line. An electrical indicator is also connected between each of the signal lines and a source of voltage. Means are provided for holding a signal line at the reference potential after the connected switch is operated in the other state.

DETAILED DESCRIPTION

Figure 1:
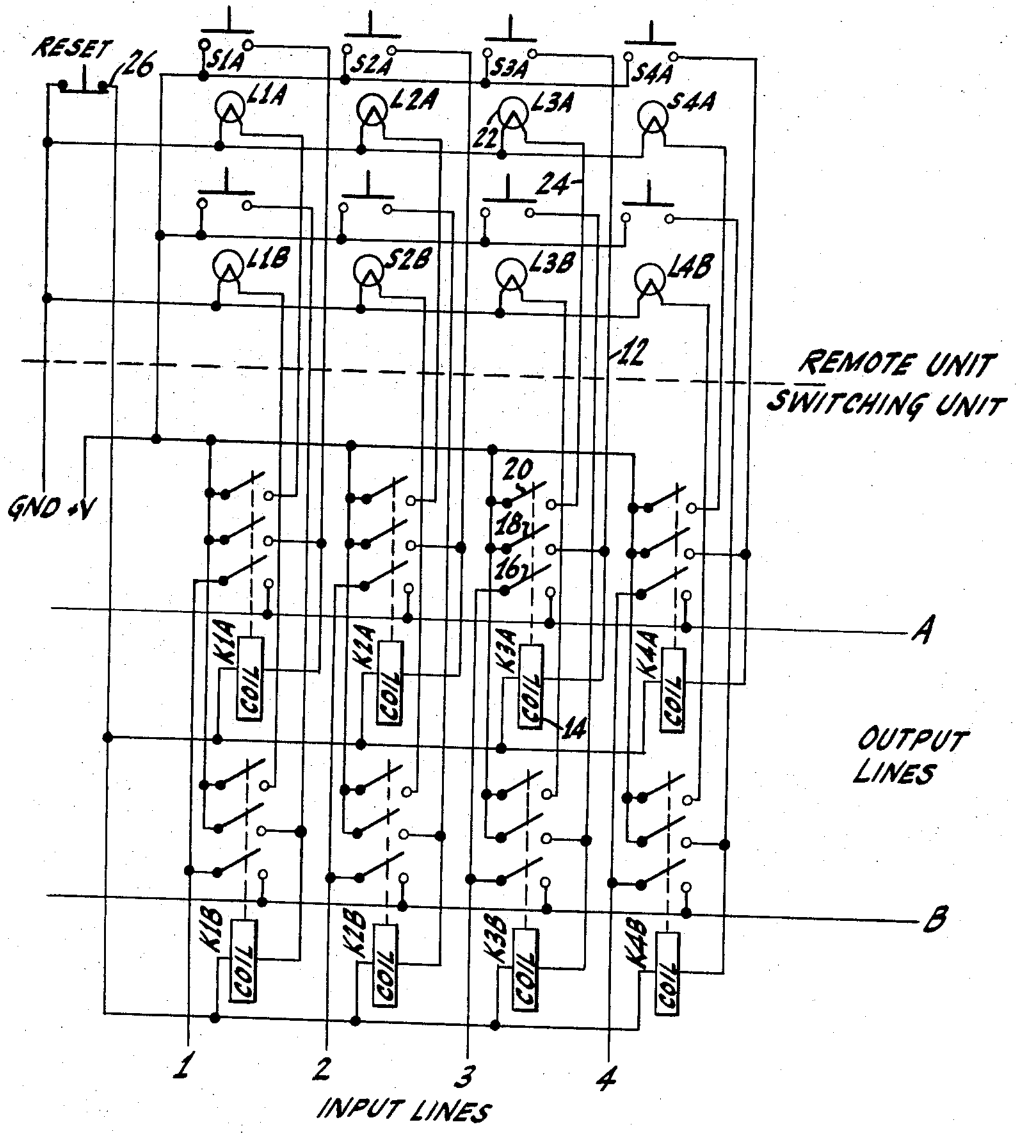
FIG. 1 illustrates a general circuit for crosspoint control.

FIG. 1 is a schematic of a circuit for providing crosspoint switching control. For purposes of illustration only four input lines and two output lines are shown. The principles are, however, applicable to any number of input or output lines. The remote control unit, or remote unit, contains a number of switches and indicators equal to the number of crosspoints to be controlled. For the purposes of discussion it is assumed that the switches are of the momentary contact type, that is, when no force is applied to them, they return to a first position. Several wires connect the remote unit with the crosspoint switching unit, or switching unit. Except for the wires supplying the voltages, there are $2 \times m \times n$ signal wires between the remote unit and the switching unit, where $m$ is the number of input lines to the crosspoints and $n$ is the number of output lines from the crosspoints. In the present example, $m$ equals four and $n$ equals two.

An explanation of how one crosspoint is made will be used to illustrate how the system of FIG. 1 operates and to point out the problems to be solved by the present invention. It will be assumed that no crosspoints are made and that it is desired to connect input line 3 to output line A. An operator presses or actuates a switch S3A 10. This completes a path connecting a voltage source to a signal line 12 which actuates a relay coil 14. The actuated relay coil 14 operates three switch contacts 16, 18, and 20 in unison. The crosspoint connection (or more simply, crosspoint) is made by the switch contact 16 which cross-connects input line 3 to output line A. The switch contact 18 performs a latching function, that is, it connects the relay coil 14 to the voltage source so that when the operator releases the switch 10 in the remote unit, the relay coil 14 will remain activated. The switch contact 20 performs the indicating function by connecting the indicator 22 to the voltage source via an indicating line 24. To release a crosspoint, the operator actuates a reset switch 26 which opens the path of all the relay coils to ground causing all the activated relays to inactivate.

The circuit of FIG. 1 has the following disadvantages:

(a) more than one input line can be connected to the same output line;

(b) if one input line is connected to output line A and another input line is connected to output line B and either output line is to have its input line changed, it is necessary to reset all the crosspoints;

(c) there is uneconomical use of the signal and indicator lines in that $(2\times m\times n)-1$ lines are idle.

The disadvantage (b), supra, can be avoided by providing a separate reset line for each output line but this would add to the number of wires between the remote unit and the switching unit and would require two switches to be actuated whenever a crosspoint is made.

Figure 2:
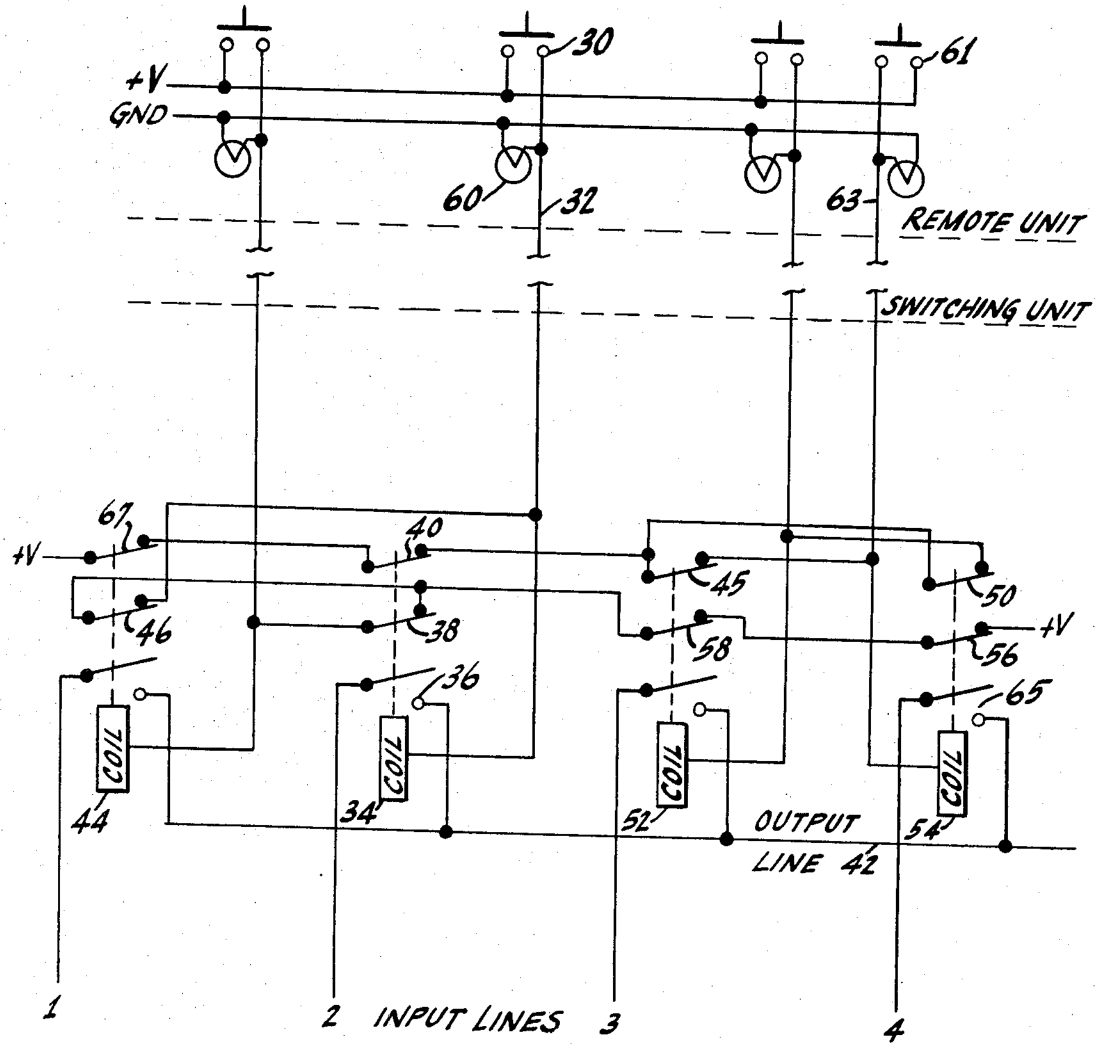
FIG. 2 illustrates a single wire circuit for crosspoint control.

FIG. 2 provides a solution to the problems. Only one output line with its associated switches is shown to simplify the diagram. To further clarify the description, the return lines of the relay coils to ground are not shown and all connections to the voltage source are shown as +V. Other output lines can be added using the same circuit as shown in FIG. 2; the only required points of commonality would be the input line connections and power connections. The operation of the circuit in FIG. 2 will be described by assuming that input line 2 is to be connected to the output line and then, at a later time, line 4 is to be connected. A momentary action switch 30 is actuated by an operator, causing the signal line 32 to be connected to the voltage source. This in turn causes the connected relay coil 34 to be activated. The switch contact 36 closed by the activated relay coil 34 performs the crosspoint function and connects the input line 2 to the output line 42. The switch contact 38 isolates the relay coil 44 associated with the input line 1 so that the switch contact 46 is closed. The activation of the relay coil 34 also opens switch contact 40 which isolates the switch contact 40 which isolates the switch contacts 48 and 50 of relay coils 52 and 54 associated with input lines 3 and 4 respectively. This isolates the relay coils 52 and 54 so that the switch contacts 56 and 58 are closed. The inactivation of the relay coils 44, 52, and 54 provide a closed path via their respective switch contacts 46, 58, and 56 to connect the signal line 32 to the voltage source so that when the operator releases the switch 30 in the remote unit, the relay coil 34 will remain activated. A crosspoint indicator 60 in the remote unit will be activated to show that the crosspoint is made. To connect the input line 4 to the output line 42 at a later time, the operator actuates its associated switch 61 in the remote unit to connect the signal line 63 to the source of voltage. This activates the relay coil 54 and causes the switch contact 65 to close, making the crosspoint between input line 4 and the output line 42. At the same time, the switch contact 56 is opened and the path of switches connecting the relay coil 34 to the source of voltage is broken, causing the relay coil 34 to be inactivated. The inactivation of the relay coil 34 causes its switch contact 40 to close. The closing of the switch contact 40 provides a closed path via the switch contacts 67, 40, and 48 of the relays 44, 34, and 52 respectively to connect the relay coil 54 to the source of voltage so that the relay coil 54 remains activated after the operator releases the switch 61 in the remote unit.

From the operation of the circuit in FIG. 2, the following improvements over the circuit in FIG. 1 are evident:

(a) only one input line can be connected to an output line;

(b) there is an automatic reset function that operates only when the input line is being changed; and (c) there is more economical use of the lines connecting the remote unit with the switching unit, viz., there are only $(m\times n)-1$ idle lines at any time.

There is still one disadvantage in the circuit shown in FIG. 2 that limits its usefulness in many applications. It is often necessary to provide a circuit external to both the remote unit and the switching unit with the information that an operator has actuated a switch, even if the switch actuated is on a line where a crosspoint is already made. For instance, in FIG. 2, assume that the crosspoint connecting input line 4 to the output line 42 is made and the operator activates the switch 61 to make the same crosspoint. The signal line 63 is already connected to the source of voltage via the switch contacts 67, 40, and 48. Therefore, the operator's action does not change any condition in the circuits and the information that a switch has been activated is lost.

Figures 3, 4:
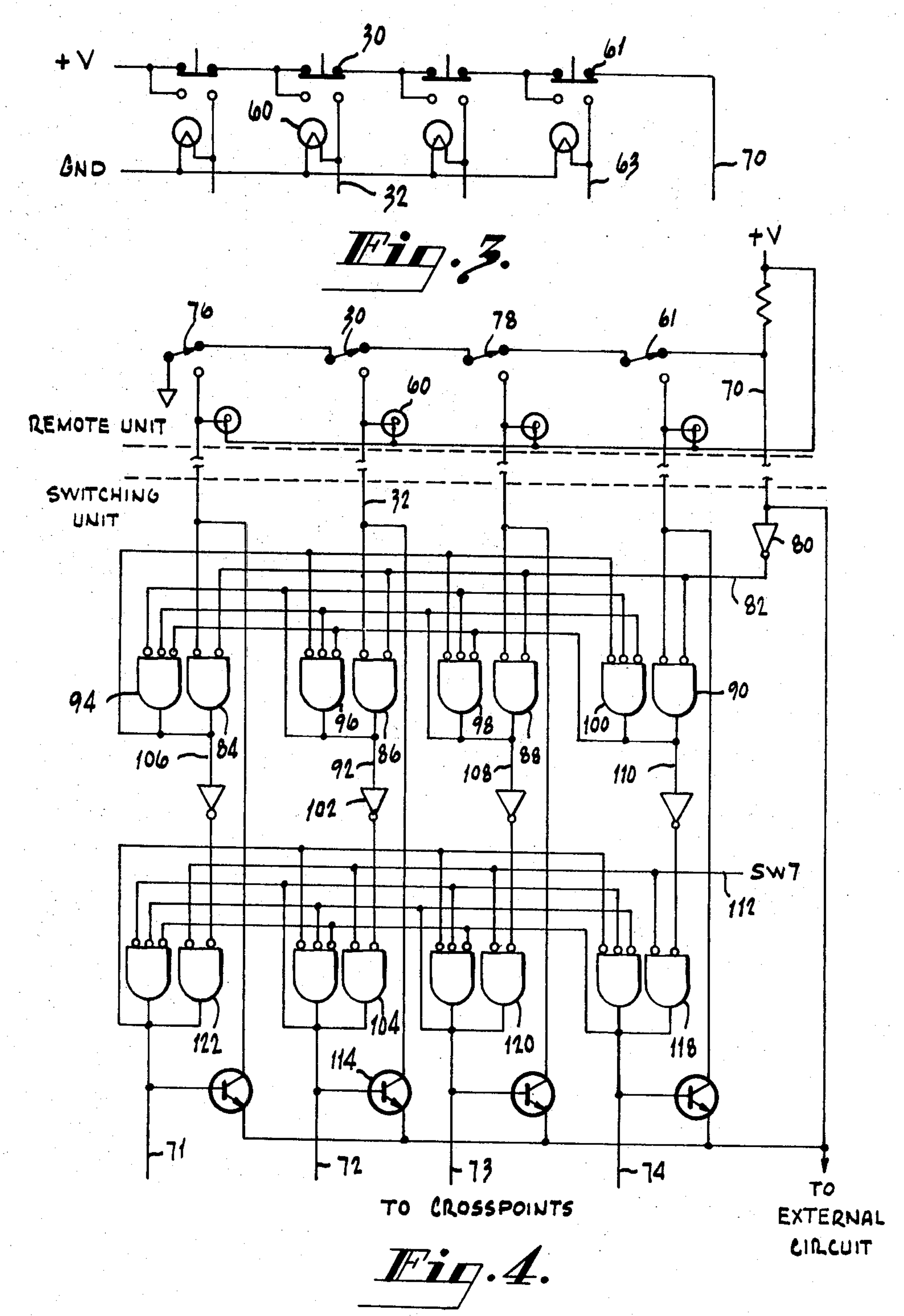
FIG. 3 shows an improved wiring scheme for the remote unit to provide an external signal.
FIG. 4 illustrates an electronic crosspoint control system including crosspoint switching at a controlled time interval.

FIG. 3 shows a circuit in the remote unit that provides the information that a switch has been activated, even if that switch is associated with a crosspoint already made. Each switch is provided with a contact that is closed when the switch is not activated. When all the switches are inactivated, an enabling line 70 is connected to the source of voltage. If any switch is activated, even one to a crosspoint already made, the enabling line 70 is disconnected from the source of voltage and this condition can be sensed by an external circuit.

FIG. 4 shows a circuit employing the use of a switching control in which the enabling line is used to signal a crosspoint command in addition to an external circuit. The circuit in FIG. 4 uses electronic—in contrast to electromechanical—controls for faster response and has the added improvement of permitting a timing signal to control the time of changing the crosspoint. The crosspoints are not shown in the figure but are assumed to be controlled by the crosspoint control lines 71, 72, 73, and 74. When, for example, an operator activates the switch 30, the signal line 32 will be connected to a reference potential, shown here as ground, via the closed contacts of another switch 76. The operation of the switch 30 also opens the connection between the enabling line 70 and the reference potential thereby causing the line to be effectively raised to the voltage represented by +V. The high voltage on the enabling line 70 is inverted to a low signal by an inverter 80 and applied to another line 82 on the output of the inverter so that all the gates 84, 86, 88, and 90 of the first level of memory elements will have one input enabled. Only one gate 86 will have the other input enabled through the associated signal line 32. This will cause the output of the gate 86 to put a high on a line 92. The high on the line 92 is inverted to a low by an inverter 102 which enables one input of a following gate 104. In addition, the output line 92 of gate 86 also applies a high to one input of each of the other gates 94, 98, and 100 of the first level of memory elements thereby disabling them. The output lines 106, 108, and 110 therefore assume a low level and each provides an enabling input to the gate 96 maintaining the output of gate 96 high. Therefore, when the operator releases the switch 30, the line 92 will remain high and the other lines 106, 108, and 110 will remain low. At the occurrence of a timing signal ($\overline{SW-T}$), the line 112 is low to enable one input of the gates 122, 104, 120, and 118 of the second level of memory elements. Only one of the gates 104 will have the other input enabled so its output will go high. In a manner analogous to that explained in the first memory level, the output of the gate 104 will be maintained high after the timing pulse goes high. The crosspoint control line 72 will remain high and the other crosspoint control lines 71, 73, and 74 will remain low. The crosspoint associated with the crosspoint control line 72 will be made. Furthermore, the high on the output of the gate 104 causes a transistor 114 to conduct connecting the signal line 32 to the reference potential through the enabling line 70 and actuating the indicator 60 to show that the desired crosspoint is made. The signal line 32 is disconnected from the reference level when another switch is activated because the reference potential is removed from the enabling line 70 by the operation of any switch in the remote unit. This prevents enabling a gate other than that connected to the signal line of the switch being activated.

It is apparent that many other memory devices are capable of use in the above circuits and that other voltage polarities and indicators may be used interchangeably with those described in the example above. It is also apparent that the switches in the remote unit can be replaced by automatically controlled electronic switches capable of performing their function upon commands from an electronic computer or other type of control device.

What is claimed is:

1. The combination comprising:

a source of electric potential having a reference terminal and a voltage terminal;

a plurality of switch means, each selectively operable in a first and a second state;

a plurality of signal lines, each signal line being connected to a different one of said switch means so that the signal line is connected to the reference terminal when the switch means to which it is connected is operated in the second state;

a plurality of electrical indicators, each connected between the voltage terminal and a different one of said signal lines; and means for connecting the signal line which was last connected to the reference terminal by the operation of its connected switch means in the second state, to the reference terminal after the switch means to which it is connected is operated in the first state and until another switch means is operated in the second state.

2. The combination claimed in claim 1 wherein there is also:

an output terminal; and means connecting the reference terminal to the output terminal when all the switch means are operated in the first state.

3. The combination comprising:

a source of electric potential having a reference terminal and a voltage terminal;

$m$ number of input lines; where $m$ is an integer;

$n$ number of output lines, where $n$ is an integer;

$m \times n$ switch means, each operable in a first and a second state;

$m \times n$ signal lines, each connected to a different one of said switch means whereby it is connected to the reference terminal when the switch means to which it is connected is operated in the second state;

an enabling line connected to said switch means whereby it is connected to the reference terminal when all the switch means are operated in said first state and connected to the voltage terminal when any of said switch means is operated in the second state;

$m \times n$ memory means, each responsive to a different one of said signal lines and said enabling line whereby one of the memory means is activated when the signal to which it is connected is connected to the reference terminal and the enabling line is connected to the voltage terminal;

$m \times n$ crosspoints, each responsive to a different one of said memory means; and $m \times n$ holding means responsive to said memory means for connecting said signal lines to the enabling line whereby the enabling line is connected to the signal line connected to the activated memory means.

4. The combination comprising:

a source of electric potential having a reference terminal and a voltage terminal;

$m$ number of input lines, where $m$ is an integer;

$n$ number of output lines, where $n$ is an integer;

$m \times n$ switch means, each operable in a first and a second state;

$m \times n$ signal lines, each connected to a different one of said switch means whereby it is connected to the reference terminal when the switch means to which it is connected is operated in said second state;

an enabling line connected to said switch means whereby it is connected to the reference terminal when all the switch means are operated in said first state and connected to the voltage terminal when any of said switch means is operated in said second state;

$m \times n$ first memory means, each responsive to a different one of said signal lines and said enabling line so that it is activated when the signal line is connected to the reference terminal and the enabling line is connected to the voltage terminal;

a timing signal;

$m \times n$ second memory means, each responsive to a different one of said first memory means and said timing signal whereby one of said second memory means is activated when the first memory means to which it is connected is activated and the timing signal occurs;

$m \times n$ crosspoints, each responsive to a different one of said second memory means; and $m \times n$ holding means responsive to the second memory means for connecting said signal lines to the enabling line whereby the enabling line is connected to the signal line connected to the first memory means that is connected to the second memory means that is activated.

References Cited

UNITED STATES PATENTS

| | | | |
|---|---|---|---|
| 2,348,666 | 5/1944 | Wallace | 340—147 |
| 3,177,409 | 4/1965 | Kroes et al. | |
| 3,462,653 | 8/1969 | Koeman et al. | 340—166 XR |
| 3,470,533 | 9/1969 | Tanner et al. | 340—166 |

DONALD J. YUSKO, Primary Examiner

U.S. Cl. X.R.

317—137